No. 624,320. Patented May 2, 1899.
C. E. FRECKLETON.
FOLDING CRATE.
(Application filed Nov. 6, 1897.)
(No Model.)
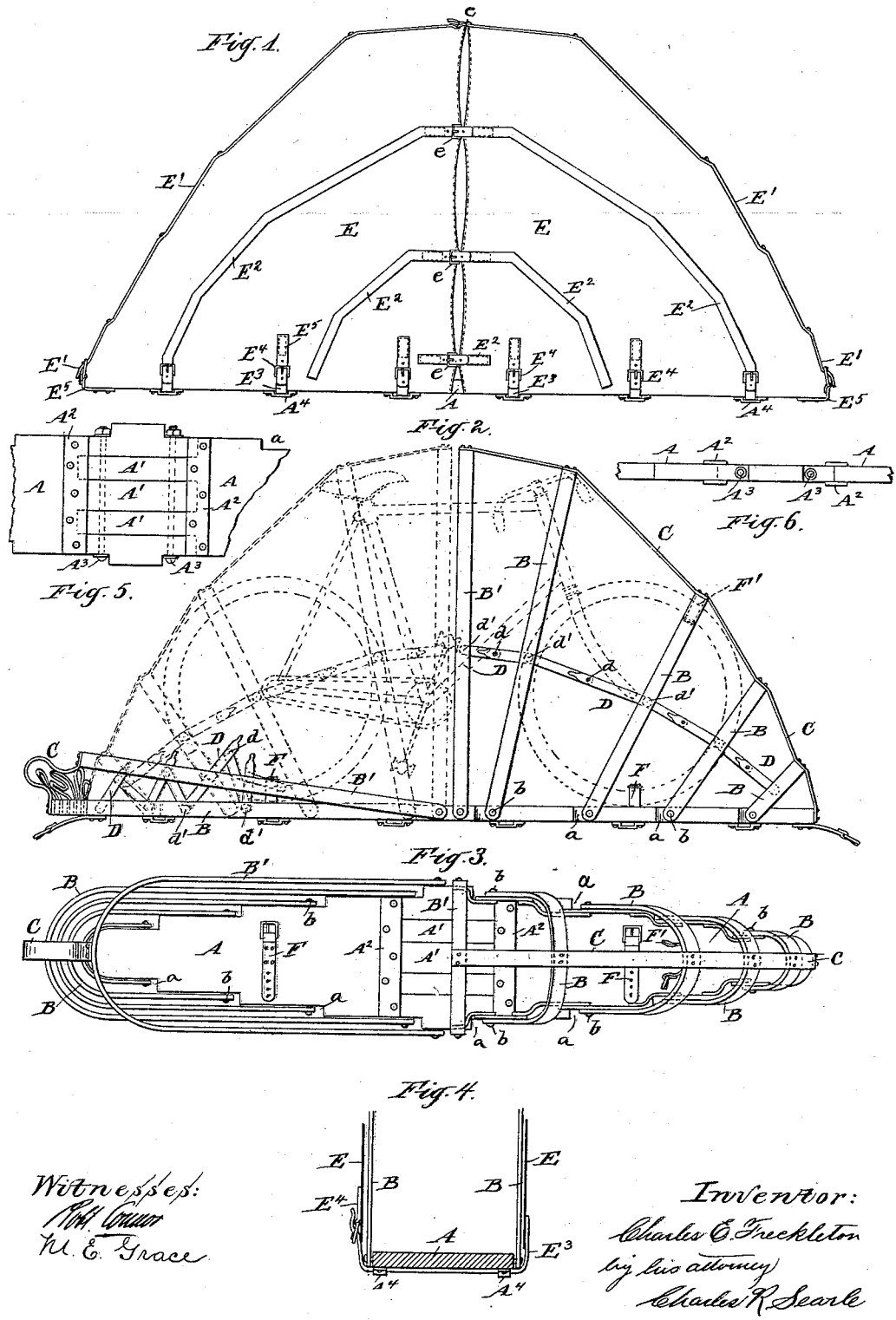
Witnesses:
Inventor:
Charles E. Freckleton
by his attorney
Charles R. Searle

UNITED STATES PATENT OFFICE.

CHARLES E. FRECKLETON, OF NEW YORK, N. Y., ASSIGNOR TO HIMSELF AND MANIERRE ELLISON, OF SAME PLACE.

FOLDING CRATE.

SPECIFICATION forming part of Letters Patent No. 624,320, dated May 2, 1899.

Application filed November 6, 1897. Serial No. 657,615. (No model.)

*To all whom it may concern:*

Be it known that I, CHARLES E. FRECKLETON, a citizen of the United States, residing in New York city, in the county and State of New York, have invented a certain new and useful Improvement in Folding Crates, of which the following is a specification.

The invention relates particularly to crates for bicycles, and is intended to afford a receptacle in which the wheel may be conveniently stored and kept free from dust when not in use and also serve as a safe and strong crate for the bicycle when needed for transportation.

It consists of a base-board diminishing in width in each direction from the transverse center line by a series of offsets in which is mounted a series of loops analogous to carriage-bows adapted to be folded down or collapsed compactly upon and inclosing the board or to be extended to form the framework for a covering of strong flexible material within which the bicycle is securely held in the upright position by straps attached to the base-board and to such of the loops as lie conveniently disposed. Each loop member of each series is preferably connected to its neighbors by folding self-locking braces, which when extended stiffen the structure, and by means of reinforcing-strips on the flexible covers, with their straps and buckles, the whole may be drawn taut to form in the distended condition a strong and light receptacle for the storage or transportation of the inclosed wheel.

In the most complete form of the invention I make the base-board in two sections, each carrying one series of loops, and provide means whereby the sections may be stiffly and reliably joined and easily separated. This construction allows the crate to be still further reduced in bulk when not required for service with the wheel or when transported in the empty condition.

The accompanying drawings form a part of this specification and show the manner in which I have carried out the invention.

Figure 1 is a side elevation of the crate complete and in the distended condition. Fig. 2 is a side elevation with the flexible covering removed. The loops at the right are shown distended and those at the left folded. Fig. 3 represents a corresponding plan view differing from the preceding figure in that the base-board is shown in the sectional form. Fig. 4 is a transverse sectional view. Fig. 5 is a plan view, and Fig. 6 an edge view, of a portion of the base-board alone.

Similar letters of reference indicate like parts in all the figures.

A is the base-board, which may be a single piece of light strong wood, as in Fig. 2, or in two sections joined at the mid-length, as shown in Figs. 3, 5, and 6. By the engagement of the interlocking tongues $A'$ $A'$ with each other and with the overlapping strips $A^2$, of metal, forming pockets in which the ends of the tongues are received, the attachment of the bicycle and flexible covers is sufficient to hold the sections thus joined against separation; but as a means to further security I have shown the bolts $A^3$ extending transversely through the alternating tongues and preventing their withdrawal.

B B are the loops or bows hinged or pivoted to the base-board at the points $b$ and arranged in two series from the transverse central line, each member being smaller than the next preceding, so that each series diminishes toward its end of the base-board. The straight side bars of the loops are parallel, and in order that the latter may lie one within the other when folded the base-board gradually narrows from the mid-length toward the ends by the series of offsets $a$, in which the loops are pivoted.

$B'$ $B'$ are loops similar in all respects to the others excepting that the length is not sufficient to inclose the adjacent loop B, and consequently they lie upon the others when folded down.

The loops in each series are connected together and to the narrow end of the base-board by a flexible band or strip C, of canvas or leather, extending along the center line and so proportioned as to length and points of junction with the bights of the loops as to allow the latter to assume the position shown at the right in Fig. 2 when tightly strained by drawing the loops $B'$ $B'$ strongly together, the two series, with the strip C, assuming an approximate semicircle in outline. The loops are stiffly held in this position by the braces D, made each in two parts pivoted together at $d$ and to the loops at the points $d'$. They are similar in construction to the braces usually employed in trunk manufacture to support the lid. The two portions interlock when extended, but may be easily broken when it is desirable to collapse the crate.

E E are the covers, of canvas or other suitable strong and flexible fabric, each shaped to inclose one series of the distended loops and joined to the latter either permanently or removably along the line of the central strap $E'$ or the side straps $E^2$, or both. The straps are equipped with buckles $e$ on the edges forming the line of junction between the covers, by which the loops $B'$ may be drawn closely and strongly together.

$E^3$ are straps secured to one face of each cover, and extending transversely beneath the base-board through the metal guides $A^4$ are removably attached to the straps and buckles $E^4$, fastened to the opposite face, and $E^5$ are straps secured to the base at its ends, buckled to the straps $E'$.

The bicycle (shown in dotted lines in Fig. 2) is held to the base-board by the straps F F, arranged to receive and engage the lower portions of the rim and tire of the front and rear wheels, and $F'$ $F'$ are similar straps attached to the inner faces of the middle loops of the two series at the points shown and similarly engaging the upper portion of each wheel. It will also be noticed that the pedals are turned to the position shown, in which both lie behind, and are protected by the loop $B'$ and the next loop B in the series. It is not necessary to remove any of the parts of the bicycle. For compactness the handle-bars are turned into a line parallel with the frame, and the seat-post and saddle are preferably lowered. The engagement of the front and rear wheels by the straps F and $F'$ is important in that the whole is bound together and stiffened.

In removing the wheel the straps $E'$ $E^2$ are loosened from their buckles $e$, allowing the loops $B'$ and the adjacent loops B to be forced backward to afford access to the straps $F'$, which are then loosened, first breaking or initiating the folding of the braces D. The bicycle is then steadied by one hand, while the loops in each series, with their covers, are folded downward as far as may be. The straps F F are then loosened and the bicycle is freed. A reversal of the operation conditions it for storage or transportation.

The crate, as shown, will collapse nearly flat with the covers in place and may be stood up out of the way or otherwise stored until again needed for use, occupying but little space and always ready for immediate service.

For clearness of illustration the braces D are omitted from the loops in the series at the left in Fig. 3. They are shown in the folded condition in the corresponding portion of the preceding figure.

An important advantage due to the arrangement of the straps F and $F'$ is in the facility with which the bicycle may be suspended clear of the base-board, so that if left unused for long periods the usual deterioration of the tires at the points of contact with the floor is avoided. By slacking the straps F and correspondingly tightening the straps $F'$ the wheels will be lifted from the base and hang thus suspended.

Modifications may be made in the details and in the sizes and proportions of the parts within wide limits. The base-board may be in one piece, as in Fig. 2, and I believe that form to be generally preferable. The sectional form is intended more particularly for tandems, "quads," and other extra long wheels. The sections may be hinged together or may be stiffly joined by other means than those shown. The loops may be of any material. As shown, they are of strong bent wood, preferably well-seasoned hickory; but they may be of other wood or bent to form from wire of any suitable metal.

I claim—

1. In a crate for bicycles, a base-board diminishing in width from the transverse center line toward the ends by a series of offsets on the side edges, two series of loops arranged on opposite sides of said center line, each loop in each series being longer and wider than the next succeeding and having its ends pivoted to said board in its corresponding offset, each series adapted to collapse by the folding of its loops one within the other, in combination with a flexible strip connecting the loops of each series, and means for drawing the two series together and securing them in the distended condition, all substantially as and for the purposes herein specified.

2. The base-board A diminishing in width in each direction from the transverse center line and having the offsets $a$, the series of loops B and $B'$ pivoted to said board in said offsets, the strip C connecting the loops of each series to each other and to the base-board, the straps F on the latter, and the straps $F'$ on one of the loops of each series, and means for holding the said loops in the distended condition, all combined and arranged to serve with a bicycle substantially as herein specified.

3. The base-board A diminishing in width in each direction from the transverse center line having the offsets $a$, loops B and $B'$ pivoted to said board at the points $b$ on said offsets, in combination with the strip C connecting the loops to each other and to the base-board, the covers E and straps $E'$, $E^2$ and buckles $e$, and the straps F and $F'$ on said base-board and loops, all substantially as herein specified.

4. The base-board A diminishing in width in each direction from the transverse center line having the offsets $a$, the two series of loops B, B' pivoted to said board at the points $b$ on said offsets in combination with the strips C connecting the loops of each series with the base-board, the covers E and straps E', E² and buckles $e$ for joining the adjacent edges of the covers and drawing the loops of both series into the distended condition, and with the straps E³, E⁴ and guides A⁴ carried on said base-board, all substantially as herein specified.

5. The base-board A diminishing in each direction from the transverse center line and having the offsets $a$, loops B and B' pivoted to said board at the points $b$ on said offsets, in combination with the strips C connecting the loops of each series with the base-board, the covers E and straps E', E² and buckles $e$ for joining the adjacent edges of the covers and drawing the loops of both series into the distended condition, the straps E³, E⁴ and guides A⁴ carried on the base-board, and the folding braces D connecting each loop of a series with the next succeeding of different size, all substantially as herein specified.

6. The base-board in two sections each having offsets $a$, the tongues A', strips A², and bolts A³ for stiffly joining the sections, and a series of loops B B' pivoted to each section at the points $b$, in combination with the strip C connecting the loops of each series to its section, the covers E, and straps E', E² and buckles $e$ for drawing the adjacent edges of the covers together and distending and holding the loops of both series distended, all substantially as herein specified.

In testimony that I claim the invention above set forth I affix my signature in presence of two witnesses.

CHARLES E. FRECKLETON.

Witnesses:
CHARLES R. SEARLE,
M. E. GRACE.